US007194608B2

(12) United States Patent
Mericas

(10) Patent No.: US 7,194,608 B2
(45) Date of Patent: Mar. 20, 2007

(54) METHOD, APPARATUS AND COMPUTER PROGRAM PRODUCT FOR IDENTIFYING SOURCES OF PERFORMANCE EVENTS

(75) Inventor: Alexander Erik Mericas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/405,050

(22) Filed: Apr. 17, 2006

(65) Prior Publication Data

US 2006/0184777 A1 Aug. 17, 2006

(51) Int. Cl.
*G06F 11/30* (2006.01)

(52) U.S. Cl. .......................... 712/227; 714/38; 714/39; 717/131

(58) Field of Classification Search ................ 712/227; 703/22; 714/38, 39; 717/131
See application file for complete search history.

(56) References Cited

U.S. PATENT DOCUMENTS

| 5,748,522 | A |   | 5/1998 | Gregoire ..................... 712/227 |
| 5,809,271 | A | * | 9/1998 | Colwell et al. ............. 712/208 |
| 6,574,727 | B1 | * | 6/2003 | Davidson et al. ........... 712/227 |
| 6,675,372 | B1 | * | 1/2004 | Damron ..................... 717/130 |
| 2003/0188226 | A1 | * | 10/2003 | Talcott et al. ................. 714/39 |

OTHER PUBLICATIONS

"Microcode-Driven Analysis of Processor Resources", IBM Technical Disclosure Bulletin, Feb. 1989, vol. 31, Iss. 9, pp. 394-395.*
"Productivity Tool for Online Tracing of an Assembly Listing Using a PER TRACE File", IBM Technical Disclosure Bulletin, Nov. 1987, vol. 30, Iss. 6, pp. 298-300.*
U.S. Appl. No. 09/435,069, filed Nov. 4, 1999.
U.S. Appl. No. 09/703,346, filed Oct. 31, 2000.

* cited by examiner

*Primary Examiner*—William M. Treat
(74) *Attorney, Agent, or Firm*—Cas Salys; Anthony V. S. England

(57) ABSTRACT

Event vectors are included in an instruction tracking structure of a processor to collect history for every instruction flowing through the processor. Such an event vector, by its nature, cannot be whole until the vector's corresponding instruction completes. However, some information for the event vector is collected earlier, i.e., as the instruction flows through the processor prior to completion. Upon completion of the instruction, the instruction's event vector is examined. In each case a determination is made from the instruction history contained in the event vector as to whether a particular instruction has or has not caused or encountered an event of interest. Responsive to the determination, and possibly other information, a selection is made between saving event vector information and discarding the information.

19 Claims, 5 Drawing Sheets

METHOD, APPARATUS AND COMPUTER PROGRAM PRODUCT FOR IDENTIFYING SOURCES OF PERFORMANCE EVENTS

CROSS-REFERENCE TO RELATED APPLICATIONS

The present application is related to the following U.S. patents "METHOD AND APPARATUS FOR INSTRUCTION SAMPLING FOR PERFORMANCE MONITORING AND DEBUG,"U.S. Pat No. 6,574,727, issue date Jun. 03, 2003; and "PERFORMANCE MONITORING BASED ON INSTRUCTION SAMPLING IN A MICROPROCESSOR," U.S. Pat. No. 6,748,522, issue date Jun. 08, 2004, both of which are assigned to the same assignee as that of the present application and are hereby incorporated herein by reference.

BACKGROUND

1. Field of the Invention

The present invention relates generally to performance monitoring in processors, and more particularly to identifying sources of performance-related events in processors.

2. Related Art

In analyzing performance of a computer system, it is common practice to monitor for certain events and conditions that are indicators of the performance. When occurrence of one of these events or conditions is detected it is essential to identify the instruction responsible for the event or that is suffering a consequence of the condition and to capture certain detailed information related to the instruction.

In general, conventional ways to do this include the following. One way is to sample instructions one at a time, and then, if a predetermined event of interest, i.e., a "monitored event," occurs for one of the sampled instructions, capture the address of the instruction and related data. This has the disadvantage that for many sampled instructions a monitored event does not occur. That is, capturing useful information depends on a chance concurrence in which the event of interest occurs for an instruction that is sampled.

Another way is to wait for a monitored event to happen and then capture the address of an instruction that is presently executing or that has just completed. This has the disadvantage that its usefulness tends to be limited to processors with short pipelines or that execute in-order and non-speculatively. As these disadvantages indicate, a need exists for improvement in identifying the source of a performance event.

SUMMARY OF THE INVENTION

The foregoing need is addressed in the present invention. According to one form of the invention, an event vector describing history of an executed instruction is collected for every instruction flowing through a processor. Such an event vector, by its nature, cannot be whole until the vector's corresponding instruction completes. However, some information for the event vector, such as the type and address of its instruction, is collected earlier, i.e., as the instruction flows through the processor prior to completion. Then, upon completion of the instruction, the instruction's event vector is examined, i.e., "sampled," or "filtered."

According to the present invention, and in contrast to conventional performance monitoring, a history of every instruction that completes is examined. In each case a determination is made from the instruction history contained in the event vector as to whether a particular instruction has caused or encountered an event of interest. Also unlike previous solutions, according to the present invention an instruction is not sampled until it has completed, at which time, according to the invention, the instruction's event vector is complete. Then, responsive to the information in the event vector a selection is made between saving information about the instruction's history in more long term memory and discarding the information. Alternatively, the event vector is merely buffered in a sample buffer for post-processing, in which case the post-processing may include this filtering of which information to keep and which to discard.

It is advantageous that according to this arrangement there is a definite correspondence between a particular monitored event and the instruction that caused or encountered the event. Also, since every instruction is monitored even for a rare event of interest information is captured about the event with certainty.

Additional objects, advantages, aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
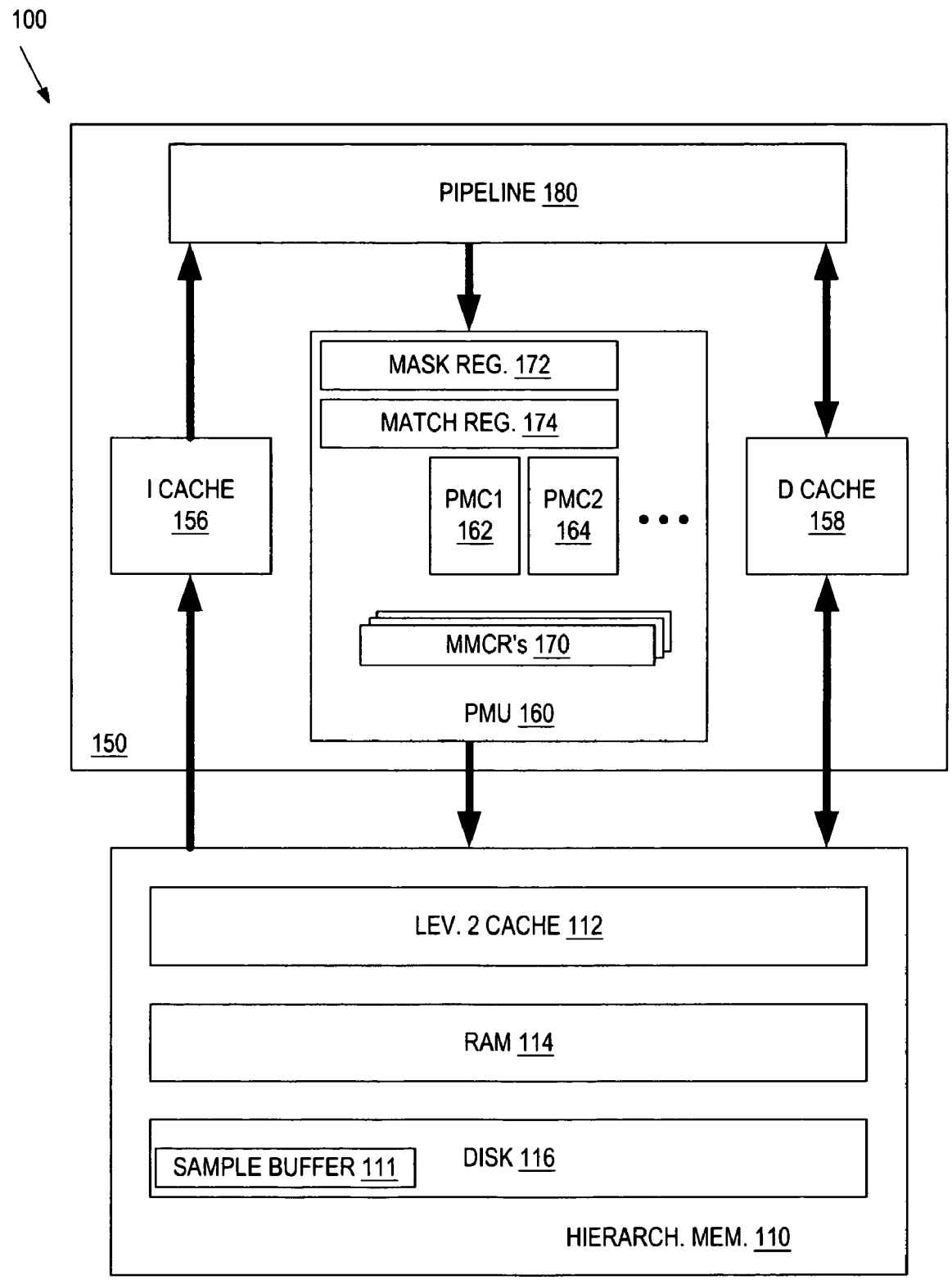
FIG. 1 illustrates a computer system that includes a performance monitor, according to an embodiment of the present invention.

Referring now to FIG. 1, a computer system 100 is shown that includes a processor 150 having a performance monitoring unit ("PMU") 160, according to an embodiment of the present invention. The system 100 may be an IBM pSeries server and the processor 150 may be one of the IBM PowerPC family of processors, for example. The system 100 also includes hierarchical memory 110 having a level 2 cache 112, random access memory ("RAM") 114 and non-volatile disk memory 116. In the illustrated system 100, disk 116 has a memory portion allocated as a sample buffer 111, as shown. It should be understood that the sample buffer 111 could be located somewhere else in memory 110. In various embodiments of the invention the sample buffer is special purpose memory, on chip or off, or a section of system memory that is dedicated for the collection of samples. In general, the sample buffer is for longer term storage than that of the event vectors described herein below.

Program instructions are transferred from memory 110 to instruction cache 156 of processor 150. Data is transferred from memory 110 to data cache 158 and vice versa. The instructions and data from caches 156 and 158 are processed by the processor's instruction pipeline 180.

The performance monitor 160 includes a number of performance monitor counters, such as PMC1 162 and PMC2 164 explicitly shown, for counting predefined processing events specified by monitor mode control registers ("MMCR's") 170 and detected by comparison of a mask register 172 and match register 174 to event vectors (not shown in FIG. 1).

Figure 2:
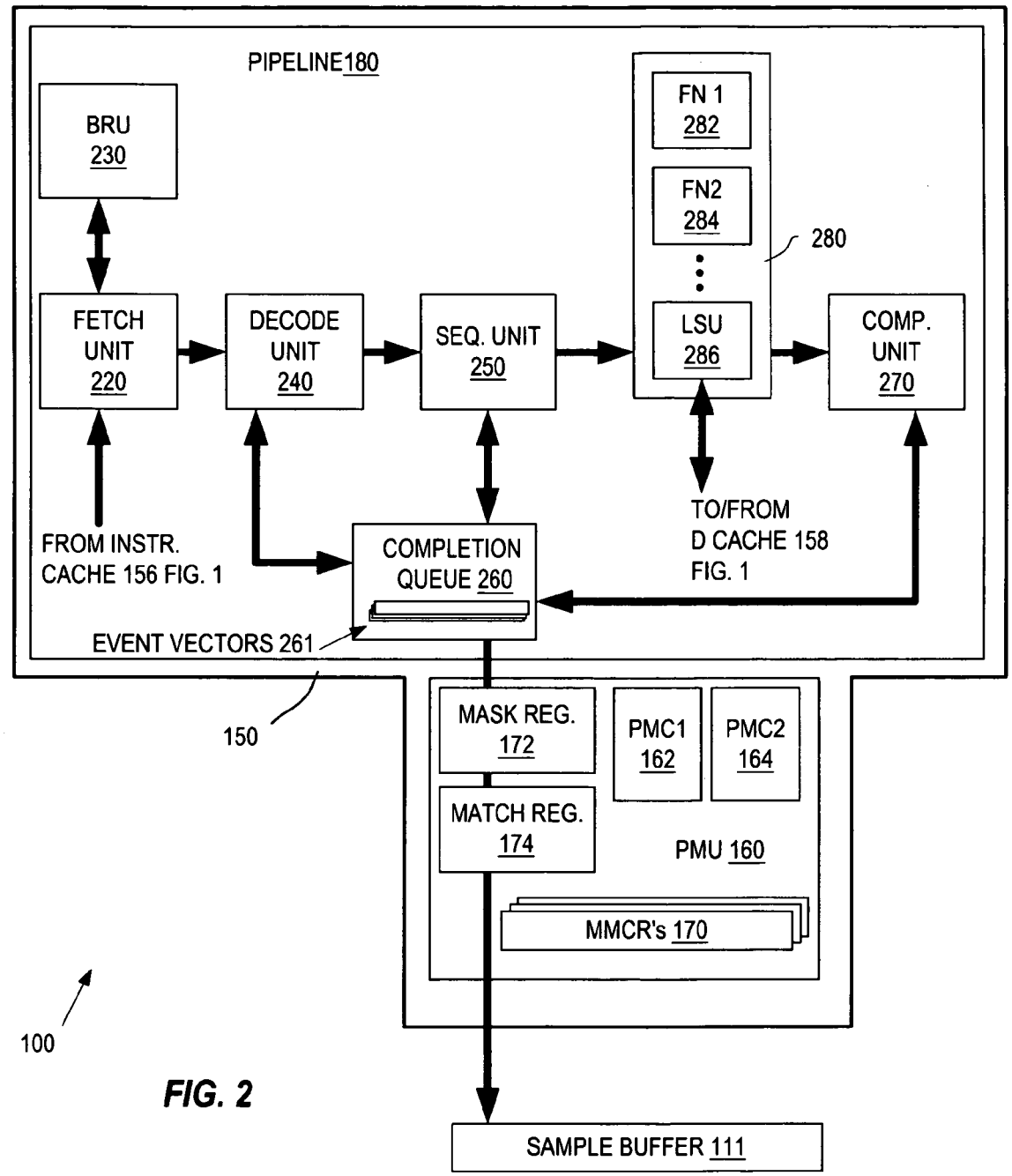
FIG. 2 illustrates certain details of the system of FIG. 1, particularly with regard to producing event vectors, according to an embodiment of the present invention.

Referring now to FIG. 2, certain details are shown for the system of FIG. 1, particularly with regard to producing in the pipeline 180 event vectors 261 that are analyzed by the performance monitor 160, according to an embodiment of the present invention. The processor pipeline 180 has a number of stages and is capable of executing multiple instructions in a single processing cycle. These include fetch unit 220, branch prediction unit ("BRU") 230, decode unit 240, instruction sequence unit 250, completion unit 270 and execution unit 280. The execution unit 280 includes a number of functional units, three of which are explicitly shown, FN1 282, FN2 284 and load store unit ("LSU") 286.

Associated with the completion unit 270 is a completion queue 260, which tracks the execution of instructions in the pipeline 180 and maintains their original program order. According to an embodiment of the present invention, a conventional structure for the completion queue 260 is supplemented as shown with additional storage space for event vectors 261. Information is collected in the event vectors 261 about the history of each and every executed instruction flowing through the pipeline 180. The existence of speculative processing facilities increases the number of instructions in the pipeline 180 at one time. Nevertheless, in the embodiment of the present invention described herein instructions are continuously monitored, i.e., event vectors are created for all instructions executing, even including speculatively executing instructions, and event vectors are examined for all the instructions. This arrangement in which every instruction is monitored throughout the pipeline 180 advantageously has logic that is in some respects less complex than that of conventional logic for deciding which instructions are subject to sampling.

Each event vector 261 is initialized for its corresponding instruction responsive to dispatching of the instruction by the sequencing unit 250. In other embodiments of the invention the event vector 261 is initialized responsive to instruction decoding by the decode unit 240. In still other embodiments the vector 261 is created for an instruction when the instruction arrives at one of the units 282, 284, etc. in the execution unit 280 instead of upon dispatch. Upon initialization, the type and address of the vector's instruction and its data operand address is stored in the vector 261.

After dispatch, as the instruction flows through the pipeline 180 the vector 261 collects more information, including occurrence indications for any of one or more predetermined, performance-related events ("monitored" events) in the processor, such as a data cache miss, load miss, dispatch stall, branch mispredict, or execution while in supervisor mode, for example. (A "condition" generally refers to a state of the processor. Herein, the term "event" is used to include such a condition.) More specifically, responsive to the occurrence of one of these monitored events as an instruction passes through one of the pipeline units 220, 230, 240, etc. such a unit 220, 230, etc. sets an indication of the particular event in the event vector 261 for the corresponding instruction. In the various embodiments of the invention, information such as the above is variously collected on initialization of the vector, during the middle of the instruction's flight or at the end, depending on the implementation.

The instruction causing or subject to a monitored event is known by its index in the completion queue 260. It is an advantage of the invention that since every instruction is monitored there is a definite, known correspondence between a particular monitored event and the instruction that caused or encountered the event, and information about the event is recorded in the event vector for the corresponding instruction.

The event vector 261, by its nature, lacks some information until its instruction completes. For example, not long before completion an instruction may encounter a data cache miss that is detected by the LSU 286 which, in one embodiment of the invention, results in turning on a data cache miss bit in the event vector 261. Also, in an embodiment of the invention the event vector has multiple bits for representing occurrence of a combination of events or conditions. For example, three bits may indicate a specific combination of as many as seven events or conditions.

Figure 3:
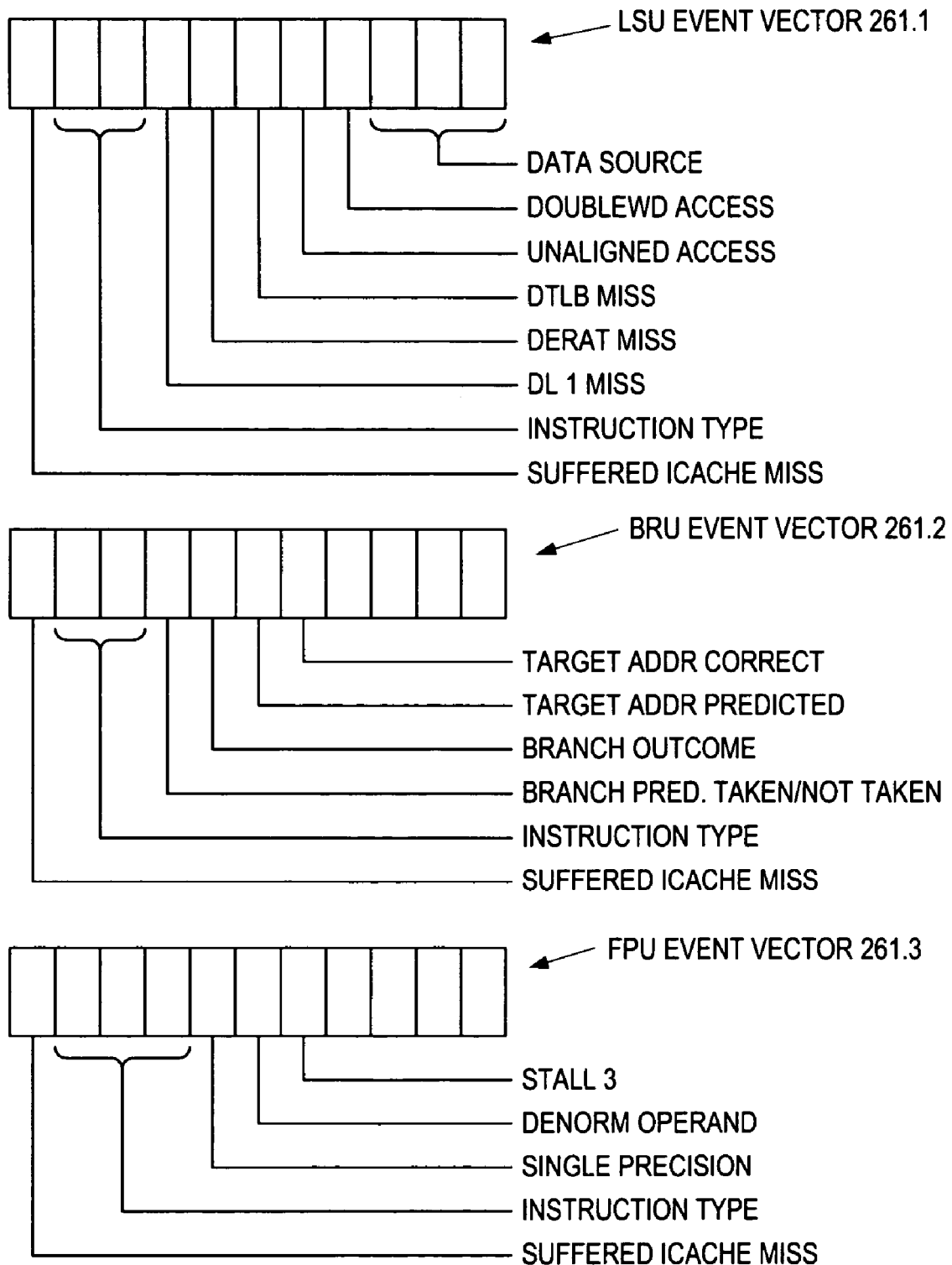
FIG. 3 illustrates three event vectors for instructions processed by three respective functional units of the system of FIG. 2, according to an embodiment of the present invention.

Referring now to FIG. 3, three example event vectors are illustrated that are associated with instructions processed by respective ones of the pipeline 180 units 220, 230, 240, etc. (It should be understood that while some of the pipeline units 220, 230, etc. process all types of instructions, some are for processing specific types. A branch instruction, for example, is processed by the BRU 230, but a floating point add instruction is not. Likewise, a floating point add instruction is processed by a floating point arithmetic logic unit but not by the BRU 230.) In the illustrated embodiment, the first event vector 261.1 is for an instruction processed by the LSU 286 of the execution unit 280, the second event vector 261.2 is for an instruction processed by the BRU 230, and the third event vector 261.3 is for an instruction processed by a floating point arithmetic logic unit (which may, for example, be functional unit FN1 282 in FIG. 2). As may be seen, the three different event vectors 261.1, 261.2 and 262.3 have different information encoded in their respective bits. This is at least partly because not every instruction can encounter every event. For example, only a load or store instruction can suffer a data cache miss.

The first bit on the left in event vector 261.1, as shown, indicates whether the load or store instruction that is associated with this vector 261.1 suffered an I cache miss. The next two bits to the right are for indicating whether the instruction is a load or store type of instruction. The next bit to the right is for indicating whether the instruction suffered a miss in the processor data cache ("DL1"). The next bit to the right is for indicating whether the instruction suffered a miss in the processor effective real data address translator array or arrays ("DERAT"). The next bit to the right is for indicating whether the instruction suffered a miss in the processor data translation lookaside buffer ("DTLB"). The next bit to the right is for indicating whether the instruction suffered an unaligned access. The next bit to the right is for indicating whether the instruction is of the double word access type or not. The last three bits on the right are for indicating the source from which data was loaded or to which it was stored, e.g., level 2 cache 112 (FIG. 1), RAM 114, etc. The first bit to the left in the BRU event vector 261.2 is for indicating whether the instruction associated with this vector suffered an I cache miss. The next two bits to the right are for indicating the type of branch instruction. The next bit to the right is for indicating whether the branch for the instruction associated with this vector was predicted to be taken or predicted to be not taken. The next bit to the right is for indicating whether the actual outcome agreed with the prediction or not. The next bit to the right is for indicating whether a branch target address was predicted or not. The last bit to the right that is used in the vector 261.2 is for indicating whether the branch target address was correctly predicted.

The first bit to the left in the FPU event vector 261.3 is for indicating whether the instruction associated with the vector suffered an I cache miss. The next three bits to the right are for indicating the type of instruction, such as add, multiply, divide, square root, etc. The next bit to the right is for indicating whether the instruction is a single precision or a double precision instruction. The next bit to the right is for indicating whether the instruction is subject to denormalization. The last bit on the right that is used in the vector 261.3 is for indicating whether the instruction encountered three or more stalls.

Note that while information relating to performance monitoring is referred to herein as being saved in event vectors 261 in the completion queue 260 (FIG. 2), in other embodiments the new event vector data storage structure may be associated with a reorder buffer, particularly for processors that support speculative execution. Moreover, the term "vector" is used to indicate that the storage location of the information for the vector is implementation dependent and that the invention is not limited to any one of the implementations. That is, information for a vector 261 could alternatively be stored in a hardware register in the processor 150 (FIG. 1), for example, or in a cache, such as level 2 cache 112 (FIG. 1), for example, or in RAM 114 main memory (FIG. 1), or even on disk drive 116 (FIG. 1). The information for a single vector 261 may alternatively even be distributed in more than one place.

Furthermore, the various information items described herein as being stored in event vectors 261 in the completion queue 260 may already reside elsewhere in the system and, in an alternative embodiment of the invention, may not actually be stored redundantly in a single-purpose event vector data storage location. For example, in one embodiment of the invention certain bits for an event vector 261 for a load or store instruction are already physically located in the LSU 286 (FIG. 2) for purposes relating to ordinary processing of the instruction and therefore are not set aside in a special data storage location. Also, although it is implied herein that the information in an event vector 261 has a certain ordering of bits, the information does not necessarily have to be stored with its bits arranged in the same certain ordering. That is, the PMU 160 examines, i.e., "filters," the stored history of the instruction in the instruction's event vector 261 in comparison with programmable mask register 172 and match register 174, and makes a determination as to whether the instruction has caused or encountered an event or condition of interest during the course of its flow through the pipeline 180. In response to detecting the monitored event or condition, the PMU 160 may: i) increment a counter, such as the previously mentioned PMC1 162, for the event or condition, ii) save selected information from the vector, such as the address of the instruction or its data operand in a software accessible register (not shown) or sample buffer 110, or iii) raise an exception so that software will be notified that the monitored event or condition has occurred.

Figure 4:
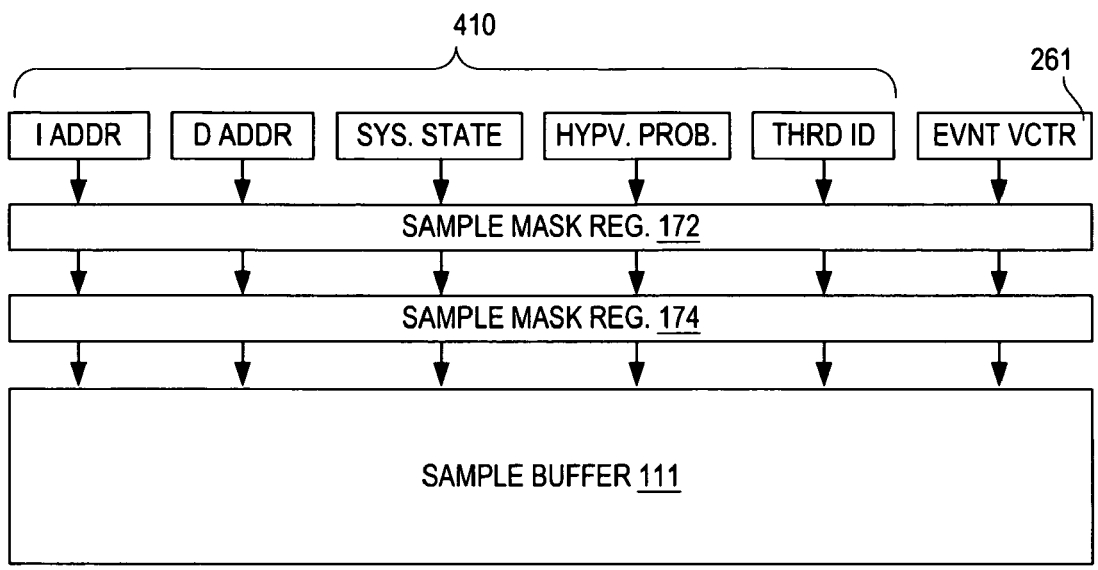
FIG. 4 illustrates aspects of sampling information for a completed instruction for saving performance-related information, according to an embodiment of the present invention.

Referring now to FIG. 4, further details are shown regarding how the PMU 160 selects which information to save regarding an instruction's processing history using the instruction's event vector 261 and the software programmable mask register 172 and match register 174. Specifically, the PMU 160 (FIG. 1) first applies the mask register 172 to one of the event vectors 261, which, as previously stated, may be in a supplemental data storage structure of the completion queue 260 (FIG. 2). The PMU 160 also applies the mask register 172 to other information 410 of interest that relates to an instruction, including i) the instruction address, ii) a data address for data operated on by the instruction, iii) system state, such as whether the instruction is being processed while the system is controlled by the user or whether there is more privileged control such as by an administrator or a hypervisor, and iv) thread identifier, according to the exemplary embodiment of the invention depicted. Information 410 may reside in a variety of locations and may alternatively be included in the event vector 261 space of the completion queue 260. Conversely, the information depicted in FIG. 4 as being in the event vector 261 data structure of the completion queue 260 may be in some other location or location instead of the completion queue 260. Therefore, it should be understood that herein the term "event vector" may include information 410.

The mask register 172 is programmed to mask out predetermined bits in the event vector 261. Then the PMU 160 compares the remaining bits of the vector 261 that are not masked out to corresponding bits in the match register 174. The match register is programmed with a certain bit pattern indicating events or conditions or combinations thereof that are of interest to the analyst. Responsive to a match for the unmasked bits of the vector 261 and the corresponding bits of the match register 174, the PMU 160 takes the actions as described above, such as incrementing a counter such as PMC1 162 (FIG. 1), saving information from the vector 261 in the sample buffer 111, etc.

Provision of mask and match registers enhances flexibility of instruction filtering. By means of comparison of event vectors to sets of mask and match registers combinations of circumstances can be identified that include "don't care" conditions. For example, suppose an instruction of type A is to be counted provided that the instruction encountered or caused a combination of events X and Y, whereas an instruction of type B is to be counted provided merely that the instruction encountered or caused event X. That is, event Y is a "don't care condition for counting an otherwise properly counted instruction type B. The event vectors for all the instructions can each be compared to first and second mask registers that filter for instructions type A and B respectively.

More specifically, for the type A mask register, the bits that identify an instruction as a type A instruction are, of course, set to the type A instruction bit pattern, and the bits that identify events X and Y are set to "1." For the type A match register, the bits that identify an instruction as a type A instruction are, of course, also set to the type A instruction bit pattern, and the respective groups of bits that identify events X and Y are set to the predefined bit patterns for "X" and "Y." In this manner, for any instruction compared to the type A mask that is not a type A instruction the output of the comparison will not match the instruction type bits of the type A match register, so that that particular mask/match register pair comparison will not result in a count. But for any instruction compared to the type A mask that is a type A instruction the output of the comparison will match the selected event bits of the type A match register if the event vector for the instruction has the bit pattern that indicates the instruction encountered or caused events X and Y.

Figure 5:
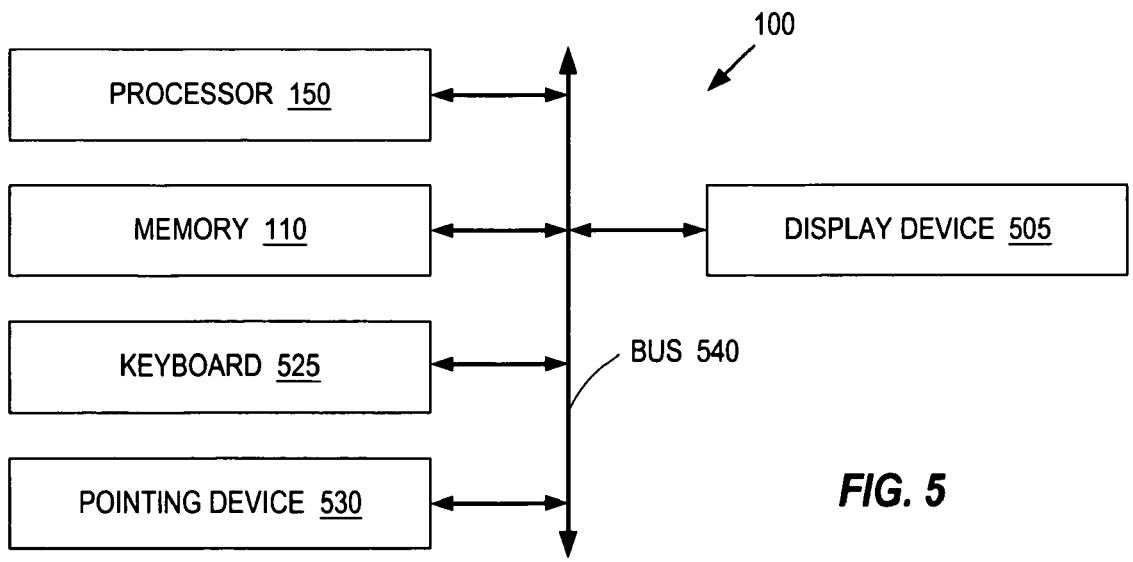
FIG. 5 illustrates a higher level view of the computer system of FIG. 1, according to an embodiment of the present invention.

Likewise, for the type B mask register the bits that identify an instruction as a type B instruction are set to the type B instruction bit pattern and the bits that identify event X are set to "1." The type B match register is likewise set up in similar fashion. But for both the mask and match registers for type B instructions the bits that identify event Y are set to "0." In this manner, for any instruction compared to the type B mask that is a type B instruction, the output of the comparison will match the selected event bits of the type B match register if the event vector for the instruction indicates the instruction encountered or caused event X regardless of whether the instruction encountered or caused event Y. Alternatively, event vectors may be non-selectively buffered in sample buffer 110 (FIG. 2) for post-processing, with the filtering done later. This "filtering" is of the same sort as has been described herein as being done by the PMU 160 (FIG. 2), but may be done by a computer system, such as shown in FIG. 5 herein below, under control of a high-level computer program performing comparisons in main memory rather than by the use of mask and match registers within the PMU 160. The depth of the sample buffer 110 is arbitrary.

In one previously mentioned aspect of an embodiment of the present invention the event vector for an instruction is not examined, i.e., "sampled," or "filtered," unless the instruction completes. With regard to counting this is advantageous because it avoids counting instructions that are executed speculatively but do not complete.

Another advantage of this invention is that it provides a direct connection between the event of interest and the instruction causing the event or subjected to the event. This in turn enables selectively counting specific combinations of circumstances. That is, the event vectors are used to identify instructions and events caused and/or suffered by those instructions, and then the mask and match registers are used to selectively count only those instructions that meet certain criteria. For example, counting may be limited to only arithmetic instructions that encounter an I cache miss and a processor stall. This example is merely for illustration. Any number of combinations may be defined for counting.

Referring now to FIG. 5, additional aspects of the computer system 100 of FIG. 1 are illustrated according to an embodiment of the present invention. Components included in system 100 are interconnected by bus 540. The system 100 includes processor 150 (FIG. 1), memory 110 (some of which, such as level 2 cache 112 (FIG. 1) may actually be on the processor 150 rather than being coupled to the processor by bus 540), a keyboard 525, a pointing device 530, e.g., a mouse, and a display device 505 having a display screen. Memory 110 is for storing program instructions which are executable by processor 150 to implement various embodiments of a method in accordance with the present invention. A communications device (not shown) may also be connected to bus 540 to enable information exchange between system 100 and other devices.

In various embodiments system 100 takes a variety of forms, including a personal computer system, mainframe computer system, workstation, client, server, Internet appliance, PDA, an embedded processor with memory, etc. That is, it should be understood that the term "computer system" is intended to encompass any device having a processor that executes instructions from a memory medium.

Accordingly, the memory medium stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries Microsoft Foundation Classes (MFC).

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Figure 6:
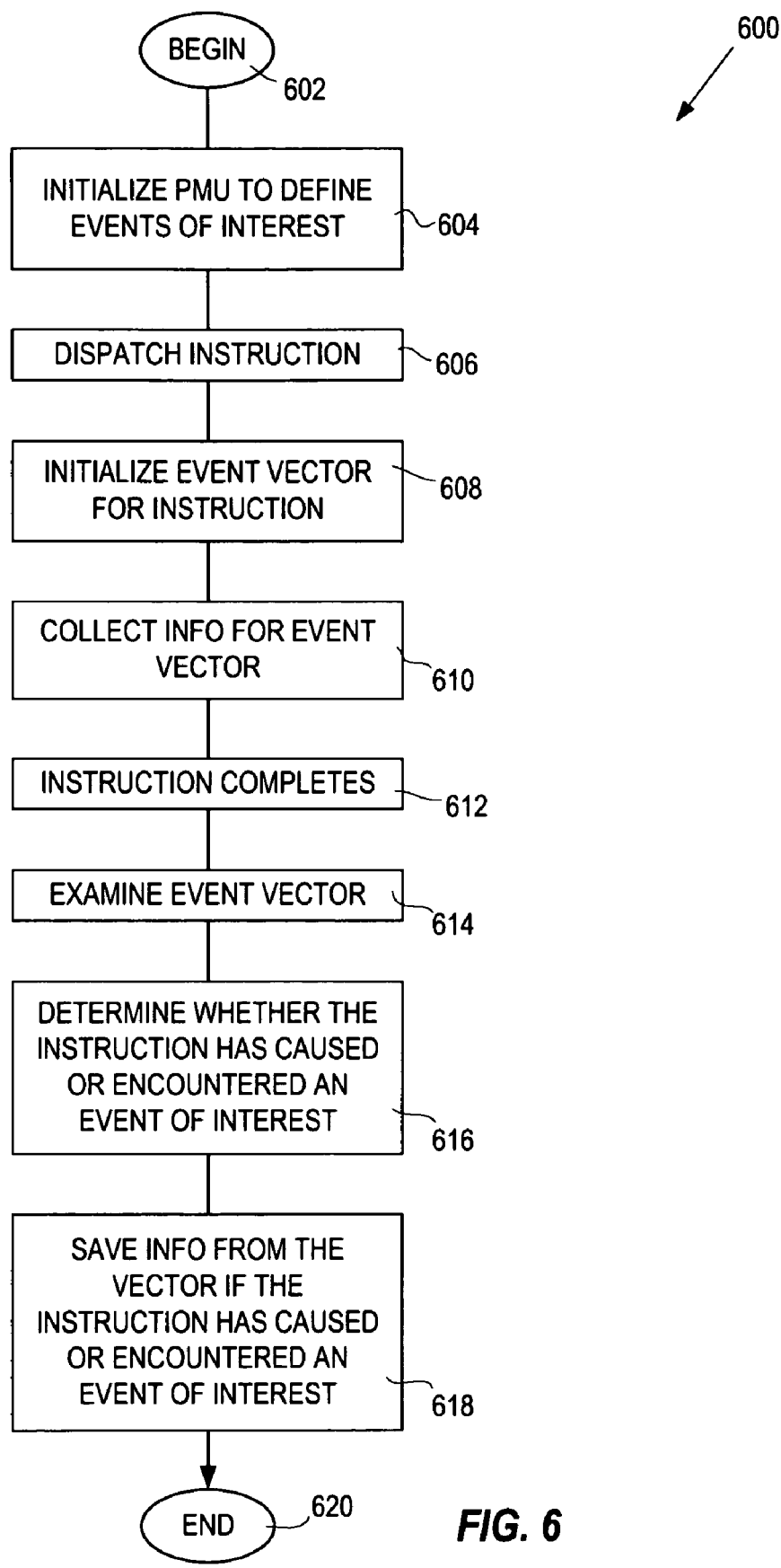
FIG. 6 illustrates logical steps for a method, according to an embodiment of the present invention.

Referring now to FIG. 6, an algorithm 600 is shown illustrating logical aspects of the present invention, according to an embodiment. The algorithm begins at 602. Next, at logic block 604, the performance monitoring unit monitor mode control registers, mask registers and match registers are initialized to define the events of interest for which information is to be captured. Next, at logic block 606, an instruction is dispatched. Then, at 608, an event vector in the completion queue is initialized for the dispatched instruction. Next, at 610, as the instruction passes through the process for pipeline information is collected in the instruction's event vector. Then, at 612, the instruction completes and the final information is collected for the event vector. At 614 the event vector is examined. In an aspect of this examination, at 616 a determination is made as to whether the instruction has or has not caused or encountered an event of interest. In a variation, a determination is also made as to whether the instruction is of a particular type, whether the processor is in a particular state, etc. Next, at 618, information is from the vector if it was determined in 616 that the instruction has caused or been subjected to the event (or events) of interest. The algorithm ends at 620.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for identifying sources of performance events in a processor, the method comprising the steps of:
   a) initializing event vectors in an instruction tracking structure of the processor;
   b) collecting information in the respective event vectors for every instruction flowing through the processor, wherein the information for such a vector includes selected execution history of the vector's associated instruction, some of the information being collected prior to completion of the instruction; and c) examining, responsive to completion of such an instruction, the history contained in the event vector for the instruction.

2. The method of claim 1, wherein step c) includes determining whether the instruction has caused or encountered a predetermined event the method comprising the step of:
selectively saving predetermined information about such an instruction's execution history from the instruction's event vector responsive to determining that the instruction has caused or encountered the predetermined event.

3. The method of claim 1, wherein step c) includes determining whether the instruction has caused or encountered a predetermined event and whether the instruction is of a certain type, the method comprising the step of:
selectively saving predetermined information about such an instruction's execution history from the instruction's event vector responsive to determining that the instruction is of the certain type and has caused or encountered the predetermined event.

4. The method of claim 1, comprising the step of saving the event vectors for post-processing, wherein the post-processing includes step c).

5. The method of claim 1, wherein step c) includes determining whether the instruction is of a certain type and has caused or encountered a certain combination of predetermined events, the method comprising the step of:
selectively saving predetermined information about such an instruction's execution history from the instruction's event vector responsive to determining that the instruction is of the certain type and has caused or encountered the certain combination of predetermined events.

6. The method of claim 1, wherein step c) comprises comparing the event vector for such an instruction to a mask register and a match register.

7. The method of claim 1, wherein the event vectors include event vectors corresponding to respective ones of the functional units and having respective structures, the structure of such an event vector being predetermined according to its corresponding functional unit.

8. An apparatus for identifying sources of performance events in a processor the system comprising:
a processor pipeline for processing instructions;
an instruction tracking structure in the processor, wherein the instruction tracking structure includes event vectors for respectively storing information temporarily for each instruction flowing through the processor, wherein the information for such an event vector includes selected execution history of the vector's associated instruction, some of the information being collected prior to completion of the instruction; and
a performance monitoring unit, operable to communicate with the event vectors, for examining, responsive to completion of such en instruction, the history contained in the event vector for the instruction.

9. The apparatus of claim 8, wherein the instruction tracking structure includes a completion queue.

10. The apparatus of claim 8, wherein the performance monitoring unit is operable to determine whether the instruction has caused or encountered a predetermined event from the examining of the history contained in the event vector and to selectively save predetermined information about such an instruction's execution history from the instruction's event vector responsive to determining that the instruction has caused or encountered the predetermined event.

11. The apparatus of claim 8, wherein the performance monitoring unit is operable to determine whether the instruction is of a certain type and has caused or encountered a predetermined event from the examining of the history contained in the event vector and is operable to selectively save predetermined information about such an instruction's execution history from the instruction's event vector responsive to determining that the instruction is of the certain type and has caused or encountered the predetermined event.

12. The apparatus of claim 8, comprising a sample buffer, wherein the performance monitoring unit is operable to save the event vectors in the sample buffer for post-processing, wherein the post-processing includes examining the history contained in the event vectors for the respective instruction.

13. The apparatus of claim 8, wherein the performance monitoring unit is operable to determine whether the instruction is of a certain type and has caused or encountered a predetermined combination of events from the examining of the history contained in the event vector and is operable to selectively save predetermined information about such an instruction's execution history from the instruction's event vector responsive to determining that the instruction is of the certain type and has caused or encountered the predetermined combination of events.

14. The apparatus of claim 8, wherein the performance monitoring unit comprises a mask register and a match register and the examining of the history contained in the event vector for the instruction includes comparing the event vector for such an instruction to the mask register and a match register.

15. The apparatus of claim 8, wherein the processor includes functional units in an execution stage of the pipeline and the event vectors include event vectors corresponding to respective ones of the functional units and having respective structures, the structure of such an event vector being predetermined according to its corresponding functional unit.

16. A computer program product for identifying sources of performance events in a processor, the computer program product comprising:
a tangible, computer readable medium;
program instructions residing on the tangible, computer readable medium, the program instructions comprising:
a) first program instructions for collecting information in respective event vectors for every processor instruction flowing through a processor, wherein the event vectors are included in an internal structure used to track the instructions within the processor, and the information for such a vector includes selected execution history of the vector's associated instruction, some of the information being collected prior to completion of the instruction; and
b) second program instructions for examining, responsive to completion of such a processor instruction, the history contained in the event vector for the processor instruction, wherein the computer program product enables improving computer performance by enabling the capture of computer performance information with certainty, since executions, of the instructions of the computer program product establishing a definite correspondence between a particular monitored event and an instruction causing or encountering the event.

17. The computer program product of claim 16, wherein the second program instructions include instructions for determining whether the processor instruction has caused or encountered a predetermined event the computer program product comprising third program instructions for selectively saving predetermined information about such a processor instruction's execution history from the processor instruction's event vector responsive to determining that the processor instruction has caused or encountered the predetermined event.

18. The computer program product of claim 16, wherein the second program instructions include program instructions for determining whether the processor instruction has caused or encountered a predetermined event, the computer program product comprising third instructions for selectively saving predetermined information about such a processor instruction's execution history from the processor instruction's event vector responsive to determining that the processor instruction is of a certain type and has caused or encountered the predetermined event.

19. The computer program product of claim 16, comprising third program instructions for saving the event vectors for post-processing, wherein the post-processing includes the examining, of the history contained in the event vector for the processor instruction performed according to the second instructions.

* * * * *